United States Patent Office 3,507,893
Patented Apr. 21, 1970

3,507,893
PROCESS FOR PREPARING ORGANOTIN MERCAPTIDES
Gerald H. Reifenberg, Plainfield, and William J. Considine, Somerset, N.J., assignors to M & T Chemicals Inc., New York, N.Y., a corporation of Delaware
No Drawing. Filed Mar. 7, 1966, Ser. No. 532,101
Int. Cl. C07f 7/22
U.S. Cl. 260—429.7                3 Claims

ABSTRACT OF THE DISCLOSURE

A process is provided for obtaining in a relatively simple and commercially advantageous manner certain organotin mercapto compounds by preparing organic thiostannate meal salts of the formula $R_aSnSM_{b/v}$ by reacting an organotin compound of the formula $R_aSmX_{b/v}$ wherein R is a hydrocarbon radical having between about 1–10 carbon atoms, X is selected from the group consisting of sulfide and an active halide, a is an integer 1–3, b is 4—a, and v is the valence of X with a metal sulfide $M_{2/v'}S$ wherein M is selected from the group consisting of an alkali metal and an alkaline earth metal and v' is the valence of M. Further, the invention includes reacting the organic thiostannate metal salt obtained above with an organic halide of the formula YR' wherein Y is an active halide and R' is a radical selected from the group consisting of alkyl, cycloalkyl, aralkyl, hydrocarbon residue of carboxylic acid salt, hydrocarbon residue of ester of carboxylic acid, and organic residue of acid halide to obtain organotin mercapto compound of the formula $R_aSn(SR')_b$ which are particularly useful as stabilizers.

---

This invention relates to a novel process for producing organic chemical compounds. More particularly, it relates to a process for preparing certain organotin compounds which may find use as urethane foam catalysts, microbiostats, or intermediates in the preparation of stabilizers for various resins including vinyl chloride.

As is well known to those skilled-in-the-art, chemical compounds typically having the formula $R_aSn(SR')_b$ may be prepared by various techniques. Although the particular process employed may depend upon the nature of the R' group (which may for example be a hydrocarbon group, an acid residue, or an ester residue), the basic process may include the reaction of typically an organotin chloride, oxide, or hydroxide with a desired mercapto compound in accordance with the following typical illustrative reaction:

$$R_2SnO + 2HSR' \rightarrow R_2Sn(SR')_2 \qquad (I)$$

In such a reaction, there may be formed tin-sulfur bonds by the coupling of the sulfur atom (of a carbon-sulfur bond) with a tin atom.

As is well known by those skilled-in-the-art, the cost of carrying out such reactions may be high. This may be inter alia because of the high cost of the charge compounds containing the carbon-sulfur bonds. For example, compounds R'SH, typically mercaptans, are expensive because they are prepared from the corresponding chlorides. The increased cost may be incurred, at least in part, because of the formation of undesirable by-products including disulfides and sulfides. As is well known to those skilled-in-the-art, most mercaptans and other such sulfur-containing compounds may be extremely expensive to synthesize; and particular care must be taken to maintain yields at a desired high level.

It is an object of this invention to prepare organic thiostannate metal salts by a process characterized by ease of preparation, and by overall low cost which organic thiostannate metal salts may be employed in an efficient synthesis of organotin stabilizers having the formula $$R_aSn(SR')_b$$

Other objects will be apparent to those skilled-in-the-art from inspection of the following description.

In accordance with certain of its aspects, the process of this invention for preparing organic thiostannate metal salt $R_aSnS_bM_{b/v}$ may comprise reacting $R_aSnX_{b/v}$ wherein R is a hydrocarbon radical, X is selected from the group consisting of sulfide and active halide, a is an integer 1–3, b is 4—a, and v is the valence of X with a metal sulfide $M_{2/v'}S$ wherein M is selected from the group consisting of alkali metal and alkaline earth metal and v' is the valence of M thereby forming organic thiostannate metal salt $R_aSnS_bM_{b/v'}$.

Practice of the process of this invention may be effected by the reaction of charge organotin compound $R_aSnX_{b/v}$. In this compound, R may be a hydrocarbon radical preferably selected from the group consisting of alkyl, alken-1-yl, cycloalkyl, aralkyl, aryl, alkaryl, including such radicals when inertly substituted. When R is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl isohexyl, heptyls, octyls, decyls, dodecyls, tetradecyl, octadecyl, etc. Alkyl radicals may also include radicals bearing ethylenic unsaturation more distant than the position alpha to the Sn atom, such as allyl, methallyl, buten-2-yl, buten-3-yl, penten-2-yl, hexen-2-yl, hepten-2-yl, octen-2-yl, decen-2-yl, dodecen-2-yl, tetradecen-2-yl, octadecen-2-yl, etc. Preferred alkyl includes lower alkyl, i.e. having less than about 8 carbon atoms, i.e. octyls and lower. When R is alken-l-yl it may typically be vinyl, 1-propenyl, buten-1-yl, penten-1-yl, hexen-1-yl, hepten-1-yl, octen-1-yl, decen-1-yl, dodecen-1-yl, tetradecen-1-yl, octadecen-1-yl, etc. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may be inertly substituted, e.g. may bear a non-reactive substituent such as alkyl, aryl, cycloalkyl, aralkyl, alkaryl, alkenyl, ether, nitro, etc. Typical substituted alkyls include 3-phenylpropyl, 2-ethoxyethy, etc. Substituted alken-1-yls include 4-phenylbuten-1-yl, γ-phenylpropen-1-yl, methoxyallyl, etc. Substituted cycloalkyls include 4-methylcyclohexyl, 4-ethoxycyclohexyl, etc. Inertly substituted aryl includes methoxyphenyl, anisyl, biphenyl, etc. Inertly substituted aralkyl includes p-phenylbenzyl, p-methylbenzyl, etc. Inertly substituted alkaryl includes 3-methoxy-5-methylphenyl, 2,6 - di - tert - butyl-4-chlorophenyl, etc.

In this compound $R_aSnX_{b/v}$, X may be selected from the group consisting of sulfur and an active halide, i.e. halide having an atomic number of at least 17, such as chloride, bromide, or iodide. a may be an integer 1–3, the sum of a and b may be 4, and v may be the valence of X. It will be apparent that when X is sulfide, a is 2, and b is 2, since v, the valence of the sulfide is 2, the formula may be $R_2SnS$. Similarly if a is 3, b is 1 and v is 2 and the formula may be $R_3SnS_{1/2}$ or $R_3SnSSnR_3$. When X is halide, the formula may be $R_3SnX$, $R_2SnX_2$, or $RSnX_3$ when a is 3, 2 and 1 respectively. Preferably a may be 2, b may be 2, X may be active halide, and the formula may be $R_2SnX_2$.

The preferred compounds wherein a is 2 may be characterized $R_2SnX_{2/v}$. Such compounds which may typically be used as charge materials may include dibutyltin dichloride, di-n-octyltin dichloride, di-n-octyltin dibromide, di-n-butyltin bromide, diphenyltin dichloride, ditolyltin dichloride, dibenzyltin dichloride, dicyclohexyltin dichloride, dibutyltin sulfide, diphenyltin sulfide, dicyclohexyltin sulfide, di-n-octyltin sulfide, ditolyltin sulfide.

The metal sulfide which may be reacted with the compound $R_aSnX_{b/v}$ may be the sulfide $M_{2/v'}S$ wherein M is selected from the group consisting of alkali metal and alkaline earth metal and $v'$ is the valence of M which may typically be potassium, sodium, calcium or barium. The preferred metal may be alkali metal, typically sodium, and the preferred sulfide may thus be sodium sulfide $Na_2S$.

In practice of the process of this invention the two charge materials $R_aSnX_{b/v}$ and $M_{2/v'}S$ may be added to a reaction mixture in substantially equivalent quantities. Preferably the organotin compound may be added to the reaction mixture as a solution in appropriate solvent, typically water or water admixed with miscible or immiscible organic solvent or such organic solvent alone. Typical organic solvents include tetrahydrofuran, toluene, isopropyl alcohol, ethanol, methanol, etc. The preferred solvent may be water.

The metal sulfide, typically sodium sulfide, may be added rapidly with agitation in aqueous solution to a solution of organotin halide. The reaction may proceed as follows:

$$R_aSnX_b + bM_{2/v'}S \rightarrow R_aSnS_bM_{b/v'} + b/v'MX_{v'} \quad (II)$$

When the organotin halide $R_aSnX_b$ is e.g. $RSnX_3$ then three moles of $M_{2/v'}S$ may be employed for each mole of $RSnX_3$, viz. (M is alkali metal in Equation IIIa and alkaline earth metal in Equation IIIb):

$$RSnX_3 + 3M_2S \rightarrow RSn(SM)_3 + 3MX \quad (IIIa)$$

$$2RSnX_3 + 6MS \rightarrow (RSnS_3)_2M_3 + 3MX_2 \quad (IIIb)$$

When the organotin halide $R_aSnX_b$ is e.g. $R_2SnX_2$ then two moles of $M_{2/v'}S$ may be employed, viz. (M is alkali metal in Equation IVa and alkaline earth metal in Equation IVb):

$$R_2SnX_2 + 2M_2S \rightarrow R_2Sn(SM)_2 + 2MX \quad (IVa)$$

$$R_2SnX_2 + 2MS \rightarrow R_2SnS_2M + MX_2 \quad (IVb)$$

When the organotin halide $R_aSnX_{b/v}$ is e.g. $R_3SnX$ then one mole of $M_{2/v'}S$ may be employed, viz. (M is alkali metal in Equation Va and alkaline earth metal in Equation Vb):

$$R_3SnX + M_2S \rightarrow R_3SnSM + MX \quad (Va)$$

$$2R_3SnX + 2MS \rightarrow (R_3SnS)_2M + MX_2 \quad (Vb)$$

As the reaction proceeds, the solution may typically change color to, e.g. olive green; and the temperature may rise by exothermic reaction to 50° C.–90° C., say 65° C. Preferably after 15 minutes–6° minutes, say 30 minutes, the temperature may drop to 30° C.–40° C., typically 35° C.

It is understood that Reaction II, supra, and each of the more specific reactions above, may be considered to proceed through two distinct steps when an organotin halide is employed as reactant, thus:

$$R_aSnX_b + b/2M_{2/v'}S \rightarrow R_aSnS_{b/2} + b/v'MX_{v'} \quad (VI)$$

$$R_aSnS_{b/2} + b/2M_{2/v'}S \rightleftharpoons R_aSnS_bM_{b/v'} \quad (VII)$$

In such a situation when $R_aSnX_b$ is $R_2SnCl_2$ the reaction may proceed in the following stages (M is alkali metal in Equations VIIIa and VIIIb and alkaline earth metal in Equations IXa and IXb):

$$R_2SnCl_2 + M_2S \rightarrow R_2SnS + 2MCl \quad (VIIIa)$$

$$R_2SnS + M_2S \rightleftharpoons R_2Sn(SM)_2 \quad (VIIIb)$$

$$R_2SnCl_2 + MS \rightarrow R_2SnS + MCl_2 \quad (IXa)$$

$$R_2SnS + MS \rightleftharpoons R_2SnS_2M \quad (IXb)$$

It is noted that the equilibrium reactions of Equations VII, VIIIb and IXb may be controlled to favor the formation of organic thiostannate metal salt. Thus, if a solvent such as water, tetrahydrofuran or isopropyl alcohol is employed the organic thiostannate metal salt may typically be formed in amount of 20%–95%, say 45%, of the stoichiometric yield. If mixed solvents are employed, such as water-isopropyl alcohol or tetrahydrofuran-isopropyl alcohol, the organic thiostannate metal salt may typically be formed in amount of 75%–95%, say 85%, of the stoichiometric yield. Preferably mixed solvent may be employed.

Furthermore, the organotin sulfide, i.e. wherein X of $R_aSnX_{b/v}$ is sulfide, may be employed as starting material without having been first prepared from organotin halide. In such a situation the reaction with metal sulfide may proceed as in Equations VII, VIIIb, and IXb.

In accordance with certain aspects of this invention the organic thiostannate metal salt $R_aSnS_bM_{b/v'}$ may be separated from undissolved solids by filtration or decanting. Alternatively the organic thiostannate metal salt may be left in situ. In either case it may be further reacted with the compound $YR'$ to produce organotin compounds $R_aSn(SR')_b$ which may be useful in stabilizing vinyl chloride resins. In the compound $YR'$, $R'$ may be a radical preferably selected from the group consisting of alkyl, cycloalkyl and aralkyl. When $R'$ is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Alkyl radicals may also include radicals bearing ethylenic unsaturation more distant than the position alpha to Y, such as allyl, methallyl, buten-2-yl, buten-3-yl, penten-2-yl, hexen-2-yl, hepten-2-yl, octen-2-yl, decen-2-yl, dodecen-2-yl, tetradecen-2-yl, octadecen-2-yl, etc. Preferred alkyl includes lower alkyl, i.e. having less than about 8 carbon atoms, i.e. octyls and lower. When $R'$ is cycloalkyl, it may typically be cyclopentyl, cyclohexyl, cycloheptyl, cyclooctyl, etc. When $R'$ is aralkyl, it may typically be benzyl, $\beta$-phenylethyl, $\gamma$-phenylpropyl, $\beta$-phenylpropyl, etc. When $R'$ is alkyl, cycloalkyl or aralkyl it may be inertly substituted, e.g. may bear a non-reactive substituent such as alkyl, aryl, cycloalkyl, aralkyl, alkaryl, alkenyl, ether, nitro, ester, etc. Typical substituted alkyls include 3-phenylpropyl, 2-ethoxyethyl, carboethoxymethyl, etc. Substituted cycloalkyls include 4-methylcyclohexyl, 4-ethoxycyclohexyl, etc. Inertly substituted aralkyl includes p-phenylbenzyl, p-methylbenzyl, etc.

$Y$ may be an active halide, i.e. a halide having an atomic number of at least 17, such as chloride, bromide, and iodide. Preferably Y may be iodide when $R'$ is an alkyl radical and chloride when $R'$ is a phenyl radical. The compound $YR'$ may typically be, e.g. an alkyl halide including methyl iodide, butyl iodide, benzyl chloride, etc., a phenyl halide including 2,4-di-nitro-chlorobenzene, etc.

$R'$ may also be a hydrocarbon residue of a carboxylic acid salt, typically alkali metal salt having the formula $R^*COOM'$ wherein $M'$ is alkali metal and $R^*$ may be selected from the same group as R, with the further proviso that one hydrogen has been removed therefrom whereby the compound $YR'$ may be formed. Typically $R'$ may be a residue of sodium acetate, sodium propionate, sodium n-butyrate, sodium benzoate, sodium phenylacetate, sodium p-methylbenzoate, etc. Thus, typically $YR'$ may be sodium chloroacetate, $ClCH_2COONa$; sodium chloropropionate, $ClC_2H_4COONa$; sodium nodobutyrate, $$IC_3H_6COONa$$

potassium bromacetate, $BrCH_2COOK$; potassium bromopropionate, $BrC_2H_4COOK$; sodium bromobenzoate, $$BrC_6H_4COONa$$

sodium bromocyclohexane carboxylate, $BrC_6H_{10}COONa$, etc. When R' is a hydrocarbon residue of a carboxylic acid, Y may preferably be chloride. The preferred compound YR' may be sodium chloroacetate $ClCH_2COONa$.

R' may also be an organic residue of an acid halide, typically having the formula RCOY. Thus, R' may be the residue of acetyl chloride, butoyl chloride, octoyl iodide, cyclohexoyl, bromide, benzoyl chloride, etc. When R' is an organic residue of an acid halide, Y may preferably be chloride. The preferred acid halide may be benzoyl chloride.

In the practice of the process of this invention the charge material YR' may be added to the solution of $R_aSnS_bM_{b/v'}$ in substantially equivalent quantities. Preferably, the compound YR' may be added in appropriate solvent, which may be same or different than the solvent employed in the initial stage of the reaction. Typical solvents for this reaction include tetrahydrofuran, toluene, isopropyl alcohol, chloroform, benzene, methanol, n-butanol, etc. Water may also be employed as a solvent, alone or admixed with solvents such as the foregoing. The preferred solvent may be tetrahydrofuran.

Reaction between $R_aSnS_bM_{b/v'}$ and YR' may proceed as follows:

$$R_aSnS_bM_{b/v'} + YR' \rightarrow R_aSn(SR')_b + bMY \quad (XII)$$

or illustratively when $R_aSnS_bM_{b/v'}$ is $RSn(SM)_3$:

$$RSn(SM)_3 + 3YR' \rightarrow RSn(SR')_3 + 3MY \quad (XIII)$$

When $R_aSnS_bM_{b/v'}$ is $R_2Sn(SM)_2$ reaction may proceed as follows:

$$R_2Sn(SM)_2 + 2YR' \rightarrow R_2Sn(SR')_2 + 2MY \quad (XIV)$$

When $R_aSnS_bM_{b/v'}$ is $R_3SnSM$ reaction may proceed as follows:

$$R_3SnSM + YR' \rightarrow R_3SnSR' + MY \quad (XV)$$

As the reaction proceeds, a precipitate of $R_aSn(SR')_b$ may form and the solution may change color such as to yellow-brown over a period of 10 minutes–2 hours, say 40 minutes. During formation of the precipitate, the reaction mixture may be agitated as by stirring. The precipitate may be recovered by separating inorganic and organic phases (if water was employed with organic cosolvent), extracting the aqueous layer, say with ethyl ether, combining the extracts with the organic phase, washing with water and removing the remaining solvent by drying and by using vacuum thereby leaving crude precipitate. The precipitate may be be purified by recrystallizing from solvent such as isopropyl alcohol or a mixture of isopropyl alcohol and tetrahydrofuran thereby obtaining a yield of $R_aSn(SR')_b$ which may be as high as 95% and is typically 80–95%.

It may be noted that in the situation wherein the compound YR' is reacted with organic thiostannate metal salt in situ the organic thiostannate ion $R_aSnS_b^-$ may be present together with some sulfur ion, $S^{-2}$, in accordance with equilibrium Equation VII, supra. When YR' is a compound which is highly electrophilic toward nucleophilic compounds (e.g. benzoyl chloride) the nucleophilic organic thiostannate ion may react preferentially since it is typically present in far greater concentration than the sulfur ion. When YR' is somewhat less highly electrophilic toward nucleophilic compounds (e.g. isoctyl chloroacetate) both concentration and nucleophilic activity of the organic thiostannate ion and sulfur ion may be considered and a significant amount of the sulfur ion may enter into reaction with compound YR'. The competing reaction can best be avoided by maximizing the concentration of organic thiostannate by preparing it in mixed solvent or by recovering it from solvent prior to reaction with compound YR'.

In accordance with certain aspects of this invention novel organic thiostannate metal salts $R_aSnS_bM_{b/v'}$ may be isolated from the reaction of $R_aSnX_{b/v'}$ and $M_{2/v'}S$, particularly where M is a higher atomic number and alkali metal (i.e. atomic number of at least 11) such as a sodium or potassium or alkaline earth metal such as magnesium, calcium, strontium or barium. Typical novel compounds may include:

n-butyl tri-thiostanate tri-sodium salt
di-n-butyl di-thiostannate di-sodium salt
di-n-butyl di-thiostannate calcium salt
di-n-octyl di-thiostannate di-potassium salt
di-n-octyl di-thiostannate calcium salt
diphenyl di-thiostannate di-sodium salt
ditolyl di-thiostannate di-sodium salt
dibenzyl di-thiostannate di-sodium salt
dicyclohexyl di-thiostannate di-sodium salt
trimethyl thiostannate sodium salt In order to more clearly point out the novel reaction of this invention the reactions of the following examples may be performed. All parts in the examples are by weight, unless otherwise specified.

EXAMPLE 1

$$(C_4H_9)_2SnS + Na_2S \rightarrow (C_4H_9)_2Sn(SNa)_2$$

7.8 parts of crushed sodium sulfide may be added to a reaction vessel followed by 7 parts of water thereby forming a slurry. 26.5 parts of dibutyltin sulfide may then be dissolved in 60 parts of isopropyl alcohol and the solution added quickly to the reaction vessel. The temperature may rise and be maintained at 55° C. for one hour thereby forming a hazy green solution. This solution may be dried over sodium sulfate for one hour. The sodium sulfate may then be removed by filtration leaving a clear yellow oil, which may be stripped by vacuum to remove the isopropyl alcohol. 42.0 parts of crude dibutyltin di-thiostannate salt may be thereby obtained. The product may be washed in 100 parts of pentane to remove any dibutyltin sulfide present, filtered and dried leaving 26.7 parts of purified dibutyltin di-thiostannate di-sodium salt which jellifies when heated to 106–110° C. The product may be characterized as highly hydroscopic.

EXAMPLE 2

$$(C_2H_5)_2SnCl_2 + 2Na_2S \rightarrow (C_2H_5)_2Sn(SNa)_2 + 2NaCl$$

$$(C_2H_5)_2Sn(SNa)_2 + 2C_6H_5\overset{O}{\underset{\|}{C}}Cl \rightarrow$$

$$(C_2H_5)_2Sn(S\overset{O}{\underset{\|}{C}}C_6H_5)_2 + 2NaCl$$

To a suspension of 84.5 parts of diethyltin dichloride in 200 parts of water there may be added rapidly, with vigorous stirring 53.0 parts of sodium sulfide dissolved in 250 parts of water. The temperature may rise to 60° C. and a white precipitate may form and immediately redissolve, yielding a deep olive-green solution along with a small amount of undissolved solid. After filtering off the undissolved solids, the solution may be returned to the flask. 95.5 parts of benzoyl chloride may be added rapidly to the stirred solution through the top of a condenser followed by a wash with 44.4 parts of tetrahydrofuran in order to insure complete transfer of benzoyl chloride. The olive-green solution may gradually be discharged accompanied by the precipitation of tan solids as the temperature rises to 65° C. After stirring for three hours longer without applying external heat, the mixture may be filtered with water suction. The light tan solids may be collected, washed with distilled water until chloride free, and then dried in a circulatory oven at 50° C. 146.2 parts of crude diethyltin di(thiobenzoate) may be thereby obtained having a melting point of 78.5–83° C. A single recrystallization from 105 parts of hot hexane may purify the product diethyltin di(thiobenzoate) as a white crystalline solid having a melting point of 86–87° C. 115.1 g. of the recrystallized product may be obtained, a yield of 75.1%.

EXAMPLE 3

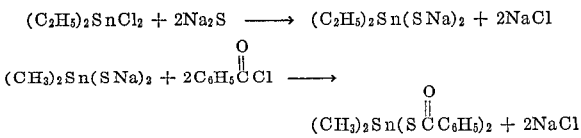

To a solution of 85.4 parts of dimethyltin dichloride in 160 parts of water, there may be added rapidly, with vigorous stirring, 60.8 parts of sodium sulfide dissolved in 250 parts of water. The temperature may rise to 65° C. and a precipitate may form immediately and redissolve, yielding a deep olive-green solution.

The temperature may be permitted to drop to 42° C., and 109.6 parts of benzoyl chloride may then be added rapidly through the top of a condenser which is then washed with 89 parts of tetrahydrofuran in order to insure complete transfer of benzoyl chloride. The temperature may rise to 65° C. during reaction and the olive-green color may gradually discharge and tan solids precipitate. After stirring for three hours and applying external heat as the temperature drops to 32°, the mixture may be warmed for 90 minutes at 40–50° C.

The mixture may then be cooled to room temperature and filtered to collect the light tan solids, which may be washed with distilled water until chloride-free, and then dried in a circulatory oven at 50° C. thereby obtaining 157.0 g. of crude dimethyltin di(thiobenzoate) having a melting point of 129–133° C. A single recrystallization from 633 parts of hot acetone may raise the melting point to 134–135° C. and render the purified product white. 133.2 g. of recrystallized dimethyltin di(thiobenzoate) may be obtained, a yield of 82.6%.

EXAMPLE 4

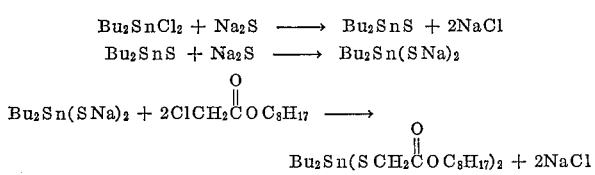

A solution containing 7.8 parts of sodium sulfide, 150 parts of water and 4 drops of Santomerse (trademark for an alkyl aryl sulfonate) in a fresh flask may be heated to 65° C. and 30.4 parts of dibutyltin dichloride may be slowly added causing the clear yellow solution to turn hazy green. The reaction temperature may rise to 85° C. and be kept there for one hour and then cooled to 40° C., at which point the agitation may be stopped and a clear yellow liquid layer of dibutyltin sulfide may settle to the bottom. The upper water layer, containing some green interfacial matter, may be decanted and the dibutyltin sulfide layer washed until chloride-free with 100 part portions of water.

To the water-washed dibutyltin sulfide there may then be added 43 parts of toluene and 7.8 parts of powdered sodium sulfide. A slow nitrogen purge may be maintained during reaction. With agitation, the mixture may be heated to 100° C. and maintained at this temperature for one hour, forming a clear yellow-green lower aqueous phase. The heat may then be removed and a Dean-Stark head attached. The mixture may be refluxed, with agitation, until removal of the water by azeotroping with toluene. With the water gone, dibutyl di-thiostannate di-sodium salt [Bu$_2$Sn(SNa)$_2$] may settle out as an off-white solid and be cooled to 32° C.

To the suspension of dibutyl di-thiostannate di-sodium salt in toluene, there may then be added 41.5 parts of isooctylchloroacetate through the top of the condenser which is then rinsed with 8.7 parts of toluene. During the exothermic reaction the temperature may rise to 82° C. and an immediate precipitate of sodium chloride form.

The temperature may be permitted to drop to about 30–35° C. over a 90-minute period and the mixture filtered with suction through a bed of Celite (a trademark for diatomaceous earth) in order to remove sodium chloride. This may be followed by a wash with 34.6 parts of toluene. The clear, off-white filtrate may be collected and the toluene solvent plus any unreacted isooctylchloroacetate may be completely removed under reduced pressure, the final temperature being 124° C. and the final pressure being 25 mm. 56.6 parts of dibutyltin bis(isooctylthioglycolate) may thus be obtained as a very pale yellow liquid in 88.5% yield.

EXAMPLE 5

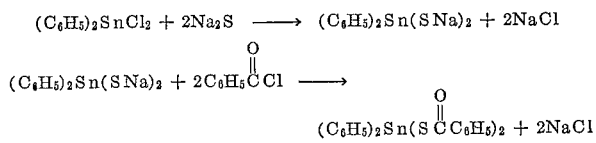

34.4 parts of diphenyltin dichloride may be dissolved in 27 parts of tetrahydrofuran in a flask. 14.0 parts of sodium sulfide dissolved in 80 parts of water may then be added, with stirring, to the solution. During exothermic reaction the temperature may rise to 55° C. A white precipitate of diphenyltin sulfide may transiently form, but then dissolve leaving a clear olive-green solution containing diphenyl di-thiostannate di-sodium salt, (C$_6$H$_5$)$_2$Sn(SNa)$_2$. This solution may be stirred for 30 minutes while the temperature drops to about 35° C. 25.3 parts of benzoyl chloride dissolved in 81 parts of tetrahydrofuran may then be added to the flask through a water condenser. Almost immediately the solution may change color to a yellow-brown suspension as the temperature rises to 55° C. and diphenyltin di(thiobenzoate) is formed.

The suspension may be stirred for 3 hours and the temperature may then be maintained at 40–50° C. for an additional hour, followed by being left at ambient temperature for several hours, during which time an upper, yellow tetrahydrofuran layer separates from a lower, cloudy aqueous phase. The phases may be transferred to a separatory funnel and 70 parts of ether added three times to extract the aqueous phase. The ether extracts may be combined, washed with water and dried for 2 days over anhydrous sodium sulfate and filtered. The anhydrous sodium sulfate may also be washed with anhydrous ether. The organic solvents may then be stripped to obtain a residue of 45.0 parts of pink solid. 44.0 parts of the residue may be heated to boiling in 785 parts of isopropyl alcohol and filtered while hot thereby obtaining a red-pink filtrate. The filtrate may be cooled to ambient temperature with the formation of crystals.

Undissolved remaining solid and crystals which form on the filter may then be dissolved in 44 parts of hot tetrahydrofuran to which isopropyl alcohol may be added until a persistant cloud remains. The solids may then be allowed to cool and crystals again reform.

Each set of crystals formed may be filtered, washed with fresh isopropyl alcohol and dried in circulatory ovens at 50° C. for 4 hours. The pure diphenyltin di(thiobenzoate) may thus be obtained in 83.2% yield and found to have a melting point of 152–153° C.

EXAMPLE 6

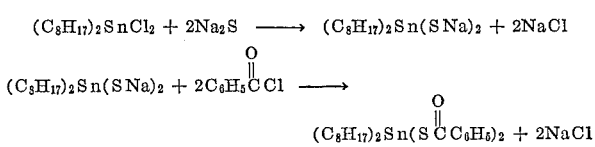

To a solution containing 23.4 parts of sodium sulfide and 150 parts of water there may be added rapidly a solution of 62.4 parts of dioctyltin dichloride in 217 parts of isopropyl alcohol. During the exothermic reaction the temperature may rise to 54° C. The mixture may be stirred for 15 minutes, 15 parts of water and 87 parts of isopropyl alcohol added as additional solvent, and stirring continued for 90 minutes. Benzoyl chloride may then be added to the flask through a condenser which is then washed with 196 parts of isopropyl alcohol. The reaction mixture may be stirred for several hours during which time the temperature rises to 53° C. Stirring may then be stopped and the reaction mixture filtered. The filtrate may be transferred to a separatory funnel to which 212 parts of ether is added. The acqueous layer may be discarded and the ether layer may be washed 4 times with 200 part portions of distilled water. The ether layer may then be dried over sodium sulfate which is filtered off. The ether may then be distilled off, leaving a residue of 64.0 parts, a 69.3% yield, of dioctyltin di(thiobenzoate), a pink-violet oil, having a refractive index $n_D^{26}$ of 1.5787.

EXAMPLE 7

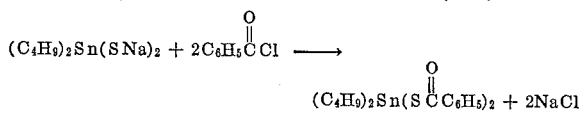

7.8 parts of sodium sulfied and 50 parts of water may be charged into a flask and agitated to dissolve the sodium sulfide. 26.5 parts of dibutyltin sulfide dissolved in 7.9 parts of isopropyl alcohol may then be rapidly charged, with agitation, into the flask. During reaction the temperature may rise to 39° C. and a hazy olive-green solution form. The reaction may then be heated at 54–57° C. for 1 hour, followed by cooling to ambient temperature and ending agitation. After settling 3.9 additional parts of isopropyl alcohol may be added and agitation restarted for 2 hours to obtain a clear lime colored solution.

28.1 parts of benzoyl chloride may then be added to the solution through a condenser which is then washed with 39.3 parts of isopropyl alcohol. During reaction the temperature may rise to 63° C. and a yellow three layer solution may form, the bottom layer being reaction product, the middle layer being aqueous and the top layer being isopropyl alcohol. 70.8 parts of ether may be added to develop two phases, the bottom being aqueous and the top organic. The water layer may be separated and discarded and the organic layer washed twice with 100 part portions of water. The water may then be drawn off and the ether removed by drying over sodium sulfate, filtering and stripping, leaving a clear, dark yellow syrup, which upon cooling to ambient temperature crystallizes as 50.7 parts of crude dibutyltin di(thiobenzoate). The crystals may be admixed with 32 parts of hot absolute ethanol and cooled again to ambient temperature in a Dry Ice-acetone bath, thereby crystallizing out product. The product may be separated from the now yellow ethanol by filtration and dried in a dish, leaving a 93.7% yield of 47.5 parts of dibutyltin di(thiobenzoate), having a melting point of 51–52° C.

EXAMPLE 8

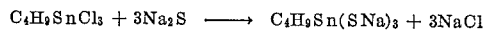
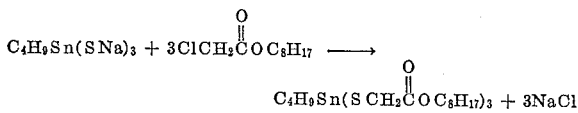

To a solution containing 11.7 parts of sodium sulfide and 75 parts of water in a fresh flask there may be added rapidly a solution of 14.1 parts of butyltin trichloride in 31.4 parts of isopropyl alcohol. The reaction may rise to a temperature of 60° C. and an olive-green color form. The temperature may then be permitted to drop to 35° C. and 31.0 parts of isooctyl chloroacetate added rapidly through a condenser which is then washed with 52.5 parts of chloroform. After about one minute the temperature may start to rise to 51° C. and the solution decolorize and separate into 2 phases. The mixture may be stirred as the temperature drops to 35° C. The mixture may then be transferred to a separatory funnel and the lower aqueous phase drawn off and extracted twice with 149 part portions of chloroform. The chloroform extracts may be combined with the organic phase, which may then be washed 4 times with 100 part portions of water. 44.4 parts of tetrahydrofuran may be added to the organic phase to facilitate drying and it may then be dried over anhydrous sodium sulfate. The mixture may be filtered to remove the sodium sulfate and the filtrate may be stripped, leaving as a residue 37.1 parts of a pink liquid, butyltin tri(isooctyl mercaptoacetate), a 94.4% yield, which residue has a refractive index $n_D^{30}$ of 1.5020.

EXAMPLE 9

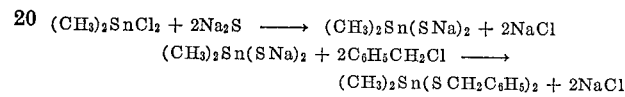

To a solution of 69.2 parts of dimethyltin dichloride in 150 parts of water, there may be rapidly added, with stirring a solution of 49.1 parts of sodium sulfide in 210 parts of water. An initial precipitate may form and redissolve thereby forming a clear, deep olive-green solution, as the reaction temperature rises to 65° C. The solution may be cooled to 50° C. and 79.7 parts of benzyl chloride added through a condenser which is then washed with 26.4 parts of tetrahydrofuran. The temperature may dip to 47° C. for 50 minutes and may then be maintained at 45° C. for several hours by heating during which time the color of the solution may gradually become lighter. The solution may be heated for 2 additional hours at 70° C. and transferred to a separatory funnel. 140.2 parts of ether may be added to the separatory funnel and the mixture shaken. The lower aqueous layer may be separated, dried over sodium sulfate, filtered to remove the sodium sulfate and the filtrate stripped, leaving 119.5 parts of a light yellow liquid, dimethyltin di(benzyl mercaptan), a 96.1% yield.

EXAMPLE 10

$(CH_3)_2SnCl_2 + 2Na_2S \rightarrow (CH_3)_2Sn(SNa)_2 + 2NaCl$ $(CH_3)_2Sn(SNa)_2 + 2C_4H_9I \rightarrow (CH_3)_2Sn(SC_4H_9)_2 + 2NaI$ To a solution of 109.9 parts dimethyltin dichloride in 200 parts of distilled water there may be added rapidly, with stirring, a solution of 78.0 parts of sodium sulfide in 430 parts of water. A white precipitate may initially form and redissolve to yield a deep olive-green solution, as the temperature rises to 60° C. The temperature of the mixture may then be permitted to drop to 44° C., at which time 183.9 parts of butyl iodide may be added through a condenser which is then washed with 44.4 parts of tetrahydrofuran. The solution may become lighter in color and its temperature drop to 39° C. in 15 minutes. The mixture may be heated to 55° C. for 20 hours and then cooled to ambient temperature at which time it may be transferred to a separatory funnel. 141.6 parts of ether may be added to the separatory funnel and the mixture shaken. Two phases may then separate and the lower aqueous phase may be drawn off and extracted with 70.8 parts of ether. The ether extract and the ether phase may be combined and dried over anhydrous sodium sulfate. The sodium sulfate may be removed by filtration and the ether stripped at 60° C. under reduced pressure, leaving 141.9 parts of crude dimethyltin di(butyl mercaptan) as a light yellow liquid which may then be puried by distillation to obtain 105.1 parts of pure dimethyltin di(butyl merctptan), a 64.3% yield. The product may be found to have a boiling point of about 110° C./0.7 mm. and a refractive index $n_D^{25}$ of about 1.5370.

EXAMPLE 11

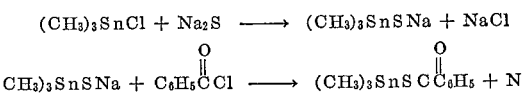

To a solution of 52.6 parts of trimethyltin chloride in 150 parts of distilled water there may be added rapidly 20.6 parts of sodium sulfide in 150 parts of water. The reaction mixture may first become opaque white and then light green solution together with a small green lower layer. The temperature during reaction may rise to 47° C. and the mixture may subsequently be heated to 60° C. for 30 minutes and then permitted to cool to 45° C.

A solution of 37.1 parts of benzoyl chloride in 88.8 parts of tetrahydrofuran may then be added rapidly to the reaction mixture and the temperature during this reaction may rise to 63° C. as the green color is discharged. The temperature may be permitted to drop to 55° C.; the mixture may then be heated to 65°–68° C. for 30 minutes and then cooled to ambient temperatures for 16 hours while being stirred. The mixture may be transferred to a separatory funnel, the lower organic layer drawn off and the upper aqueous layer extracted twice with 70.8 part portions of ether. The ether extracts may then be added to the organic layer and washed 3 times with 100 part portions of distilled water. The organic layer may then be dried over sodium sulfate for 1 hour, filtered to remove the sodium sulfate and stripped to distill out any ether or tetrahydrofuran still present, leaving 77.8 parts of crude trimethyltin di(thiobenzoate). The crude product may be purified by dissolving in pentane and hexane several times, filtering and distilling to obtain an 18.1% yield of trimethyltin thiobenzoate, having a refractive index $n_D^{27}$ of 1.5906.

EXAMPLE 12

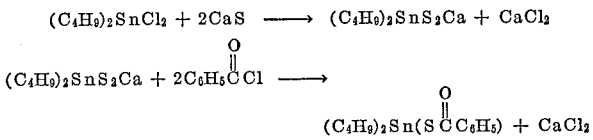

The process of Example 7 may be repeated employing 7.2 parts of calcium sulfide suspended in the water in place of sodium sulfide dissolved in the water, in the reaction with dibutyltin dichloride to form dibutyl dithiostannate calcium salt. The final product after reaction of the dibutyl di-thiostannate calcium salt with benzoyl chloride may be found to be the same as in Example 7, dibutyltin di(benzoyl mercaptide).

Although this invention has been disclosed by reference to various specific examples, it will be apparent to those skilled-in-the-art that various modifications and changes may be made thereto which fall within the scope of this invention.

What is claimed is:

1. A process for preparing organotin mercapto compound $R_aSn(SR')_b$ comprising (I) reacting $R_aSnX_{b/v}$ wherein R is a hydrocarbon radical having between about 1–10 carbon atoms, X is selected from the group consisting of sulfide and active halide, $a$ is an integer 2, $b$ is 2, and $v$ is the valence of X with a metal sulfide, $M_{2/v'}S$ wherein M is selected from the group consisting of alkali metal and alkaline earth metal and $v'$ is the valence of M thereby forming organic thiostannate metal salt $$R_aSnS_bM_{b/v'}$$

removing all water from (I); and (II) reacting said organic thiostannate metal salt $R_aSnS_bM_{b/v'}$ with an organic halide YR' wherein Y is an active halide and R' is a hydrocarbon residue of ester of carboxylic acid.

2. The process for preparing organotin mercapto compound $R_aSN(SR')_b$ as claimed in claim 1 wherein said organic thiostannate metal salt is recovered from the reaction medium prior to reaction with said organic halide YR'.

3. The process of preparing organotin mercapto compound as claimed in claim 1 wherein YR' is isooctyl chloroacetate.

References Cited

UNITED STATES PATENTS

| | | | |
|---|---|---|---|
| 2,746,946 | 5/1956 | Weinberg et al. | 260—429.7 X |
| 2,789,103 | 4/1957 | Weinberg et al. | 260—429.7 X |
| 2,832,753 | 4/1958 | Weinberg et al. | 260—429.7 X |
| 3,108,126 | 10/1963 | Cranland | 260—429.7 |

OTHER REFERENCES

Henry et al. J. Organic Chem. (1962), vol. 27, pp. 2252–53, QD241J6

Henry et al., Canadian J., Chem. (1963), vol. 41, pp. 1276–78, QD1.C2

Schumann et al., J. Organometal. Chem. (1963), vol. 1, p. 171, QD411J6.

Schumann et al. J. Organometal. Chem. (1964), vol. 11, p. 97, QD411J6.

Hooton et al., Inorg. Chem. (1965), vol. 4, p. 672, QD1I7.

Henry et al., J. Org. Chem. (1963), vol. 28, p. 225, QD241J6.

TOBIAS E. LEVOW, Primary Examiner

W. F. W. BELLAMY, Assistant Examiner